United States Patent
Kavanapillil et al.

(10) Patent No.: US 9,489,157 B2
(45) Date of Patent: Nov. 8, 2016

(54) PRINTABLE OBJECT PROCESSING

(75) Inventors: Ramesh Kavanapillil, Bangalore (IN); Daniel Varghese, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 840 days.

(21) Appl. No.: 13/349,935

(22) Filed: Jan. 13, 2012

(65) Prior Publication Data
US 2013/0182283 A1    Jul. 18, 2013

(51) Int. Cl.
G06F 3/12        (2006.01)
G06F 21/60       (2013.01)

(52) U.S. Cl.
CPC ........... *G06F 3/1222* (2013.01); *G06F 3/1238* (2013.01); *G06F 3/1285* (2013.01); *G06F 21/608* (2013.01)

(58) Field of Classification Search
None
See application file for complete search history.

(56) References Cited

U.S. PATENT DOCUMENTS

| | | |
|---|---|---|
| 2003/0038979 A1 | 2/2003 | Seki et al. |
| 2003/0187939 A1 | 10/2003 | O'Brien |
| 2004/0184060 A1 | 9/2004 | Nathan |
| 2005/0168776 A1* | 8/2005 | Yamaguchi .................. 358/1.15 |
| 2006/0026247 A1* | 2/2006 | Shobu .......................... 709/206 |
| 2010/0060928 A1 | 3/2010 | Lee et al. |
| 2011/0235120 A1* | 9/2011 | Kinoshita et al. ........... 358/1.15 |

FOREIGN PATENT DOCUMENTS

| | | |
|---|---|---|
| JP | 2005216229 | 8/2005 |
| JP | 2009193302 | 8/2009 |

OTHER PUBLICATIONS

Automatic Print Email [online], [retrieved on Jan. 13, 2012], Retrieved from the Internet: <URL:http://www.automatic-print-email.com>.

Cloud printing on the go [online], Jan. 24, 2011, [retrieved Jan. 13, 2012], Retrieved from the Internet: <URL:http://googlemobile.blogspot.com/2011/01/cloud-printing-on-go.html>.

* cited by examiner

Primary Examiner — Tammy Pham
Assistant Examiner — Idowu O Osifade
(74) Attorney, Agent, or Firm — HP Inc Patent Department

(57) ABSTRACT

In one implementation, a printable object processing system detects a user print action relative to a printable object and identifies an attribute of the printable object in response to detecting the user print action. The printable object processing system them defines a print rule based on the attribute.

19 Claims, 3 Drawing Sheets

PRINTABLE OBJECT PROCESSING

BACKGROUND

Users of computing devices typically print printable objects manually. For example, a user can print an image file attached to an electronic mail message by selecting a print command for the image file at an electronic mail client.

Some computing devices or software applications (or applications) hosted at computing devices allow users of those applications to specify rules for printing printable objects. For example, a user can define a rule within an electronic mail client that is satisfied by electronic mail messages with attachments of a particular file type. More specifically, the rule can be satisfied by electronic mail messages with attachments that are of the Portable Document Format (PDF). When an electronic mail message satisfies the rule, the electronic mail client prints the attachment.

DETAILED DESCRIPTION

Figure 1:
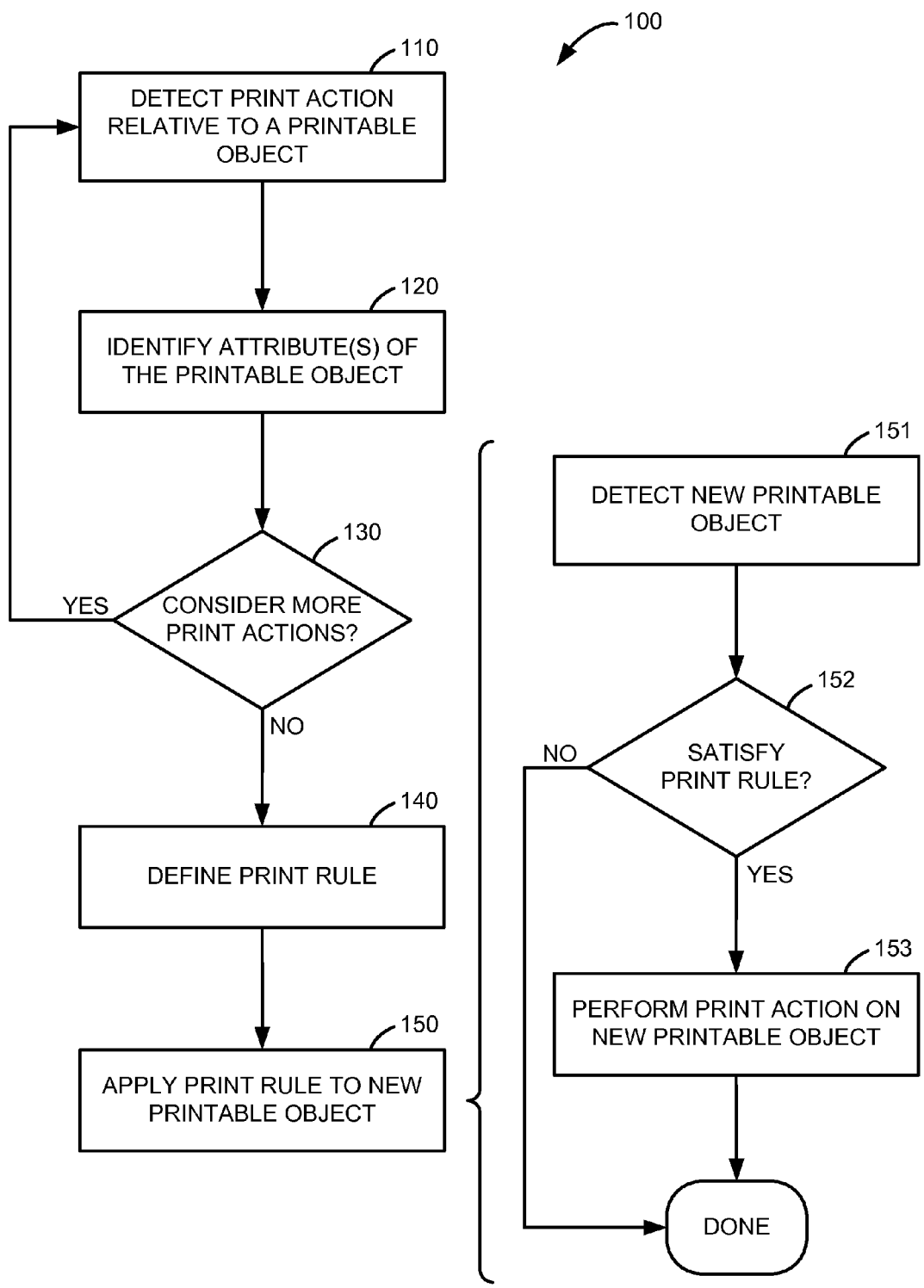
FIG. 1 is a flowchart of a process to define and apply a print rule, according to an implementation.

Implementations discussed herein define print rules in response to print actions that are performed on (or relative to) printable objects. For example, some implementations discussed herein define print rules based on attributes of printable objects relative to which a user performs (or requests or initiates via a computing device or service) a print action. As a more specific example, implementations discussed herein detect print actions relative to printable objects (e.g., printing a printable object at a printer connected to a computing device, printing a printable object at a network-connected printer, providing a printable object to a print service, or providing a printable object to a print repository), and define print rules based on attributes of those printable objects. Each print rule has one or more conditions related to the attributes of those printable objects and a print action.

In some implementations, such print rules are applied to new printable objects (i.e., printable objects other than the printable objects whose attributes where used to define the print rules) that are accessible at a computing device or service. In other words, attributes of the new printable objects are compared with one or more conditions of the print rules. If a new printable object has one or more attributes that satisfy one or more conditions of a print rule, that new printable object is said to satisfy that print rule, and the print action for that print rule is executed on (or performed relative to) that new printable object.

In some implementations, print rules are defined and applied to printable objects without user input. Thus, print rules can be defined and print actions can be performed on printable objects automatically. That is, print rules can be defined and print actions can be performed on printable objects in response to signals or commands from a printable object processing system rather than in response to input from a user. As a result, a printable object processing system can, for example, identify attributes of printable objects on which a user performs print actions (e.g., that a user prints at a printer) and apply print actions to other printable objects that have those same attributes without specification of those attributes from the user.

For example, a printable object processing system can monitor actions performed by a user (or user actions) at a computing device or service (e.g., an application, a web application, or a data or content repository), and detect print actions requested by a user (or user print actions) relative to printable objects when the user prints those printable objects. The printable object processing system then defines print rules based on attributes of those printable objects. Thus, the printable object processing system defines print rules in response to user print actions rather than in response to user descriptions of print rules (e.g., user-specified attributes and/or print actions).

Similarly, a printable object processing system can monitor a computing device or service to detect when new printable objects are received or become accessible, and apply print rules to the new printable objects. That is, for example, the printable object processing system can compare attributes of the new printable objects with conditions of print rules to determine whether any of the new printable objects satisfy any of the print rules. The printable object processing system can then execute the print action for each print rule relative to the new printable objects that satisfy that print rule. For example, printable object processing system can provide the new printable objects that satisfy a print rule to a print repository from which a user can request printing of printable objects via a network-connected printer.

FIG. 1 is a flowchart of a process to define and apply a print rule, according to an implementation. Process 100 illustrated in FIG. 1 is an example implementation of a process to define and apply a print rule. Other implementations can include additional, fewer, or rearranged blocks with respect to the example illustrated in FIG. 1.

A print action relative to a printable object is detected at block 110. A printable object is content or a data set that can be stored at a memory and printed at a printer. For example, a word processing document file (e.g., a Microsoft Word™ document), an image file (e.g., a Joint Photographic Experts Group (JPEG), Portable Network Graphics (PNG), or bitmap image file), an electronic mail message, a Portable Document Format (PDF) file, or any other data set or portion thereof that can be printed.

A print action is an operation that is associated with printing. For example, printing a printable object at a local printer (e.g., a printer connected to a computing device), printing a printable object at a network-connected printer, providing a printable object to a print service (e.g., sending the printable object to an electronic mailbox associated with a network connected printer), or providing a printable object to a print repository. Such print actions are relative to a printable object when performed on a printable object.

Print actions can be detected at block 110 using a variety of methodologies. For example, a printable object processing system can instrument a runtime environment of an application (or a group of applications) to receive notifications when print actions are performed on printable objects within that application. That is, the runtime environment can be instrumented to provide notifications to the printable object processing system in response to execution of a print action relative to a printable object. Such notifications can include information related to the print action (e.g., a type or class of print action) and to the printable object on which the print action is performed (e.g., attributes of the printable object, an identifier such as a file system path of the printable object, and/or the printable object itself). As used herein, the term "to instrument" means interface with, interact with, and/or extend functionality of.

As a specific example, a printable object processing system can register with hooks of a runtime environment such as an operating system via an application programming interface (API) of the runtime environment to receive events, messages, function calls, method invocations, or some other notification when print actions are performed on printable objects. As another example, instructions or code implementing an application (or group of applications) and/or a runtime environment can be modified to instrument the application and/or runtime. For example, the application can be a Java™ application hosted within a Java™ Runtime Environment (JRE). The printable object processing system can instrument the Java™ application and/or JRE by modifying bytecode of the Java™ application and/or JRE to provide notifications to the printable object processing system when print actions are performed on printable objects.

In some implementations, a printable object processing system can detect print actions via a plug-in interface of the application. For example, the printable object processing system can register with the application to receive notifications when the application performs a print action relative to printable objects. Similar to the notifications discussed above, such notifications can include information related to a print action and printable object relative to which the print action is performed. In other words, the printable object processing system can be a plug-in or extension to an application (or a group of applications). As a specific example, the application can be a browser application (e.g., a web- or Internet-browser), and the printable object processing system can be a plug-in or extension to the browser application. As another example, the application can be an electronic mail client (or email application), and the printable object processing system can be a plug-in or extension to the electronic mail client.

After a print action relative to a printable object is detected at block 110, one or more attributes of the printable object are identified at block 120. For example, attributes of the printable object are identified using information included in a notification from a runtime environment or from an application. Attributes are properties or characteristics of a printable object, and a printable object can include a variety of attributes. For example, attributes of a printable object can be any of a variety of attribute types such as: a file type, a content type, an origin or source (e.g., a sender address or domain of an email including a printable object or author of a file including a printable object), a destination (e.g., a recipient address or domain of an email including a printable object), metadata fields or categories, a filesystem path, a size (e.g., a file size, a resolution of an image or graphic), or a date or age.

The attribute types identified at block 120 can vary according to different implementations. In some implementations, the attribute types identified at block 120 and analyzed at block 140 (discussed in more detail below) can be configurable for a printable object processing system. For example, a printable object processing system can access configuration parameters at a configuration file that defines which attribute types are of interest to the printable object processing system. That is, the configuration file defines which attribute types are identified at block 120 and/or analyzed at block 140. In some implementations, the printable object processing system can define a configuration interface such as a graphical user interface (GUI) at which a user can specify which attribute types are of interest to the printable object processing system.

At block 130, a printable object processing system implementing process 100 determines whether more print actions should be considered before defining a print rule at block 140. For example, a number of print actions that should be considered can be specified similarly as discussed above in relation to attribute types of interest. In some implementations, the number of print actions can be for a particular type of print action (e.g., printing at a local printer, printing at a network-connected printer, providing to a print service, or providing to a print repository). In other implementations, rather than a number of print actions that should be considered, print actions should be considered for a period of time (e.g., specified similarly as discussed above in relation to attributes of interest) before a print rule is defined at block 140.

Furthermore, in some implementations, print actions are considered until a particular number of print actions are applied to printable objects with a common attribute (e.g., an attribute that is identical or similar for each printable object). For example, print actions should be considered until a predetermined (or specified) number of print actions have been performed relative to printable objects with a common attribute such as a file type or origin, or with a group of common attributes. Accordingly, in some implementations, information related to print actions, printable objects, and attributes of printable objects are cached or stored by a printable objects processing system for analysis at blocks 130 and/or 140.

If more print actions should be considered at block 130, process 100 returns to block 110 to detect additional print actions. If no additional print actions need be considered at block 130, process 100 proceeds to block 140 to define a print rule. As used herein, a print rule includes a condition related to an attribute of printable objects and is associated with a print action. The print action can be implicitly associated with a print rule (e.g., the print action for the print rule is specified at the printable objects processing system rather than at the print rule), or explicitly associated with the print rule (e.g., the print action is specified at the print rule). The condition specifies an attribute (or range or group of attributes) that satisfy the print rule.

A print rule can be defined, for example, by determining whether a threshold quantity or frequency of print actions has been performed relative to printable objects with a common attribute. Such a threshold quantity or frequency and attribute can be provided as discussed above in relation to block 130 (e.g., can be specified in configuration information such as a configuration file or by a user via an interface), and can vary according to different implementations. For example, for print rules that are highly sensitive to change, the threshold quantity can be a relatively small number. Thus, a print rule can be defined after a few print actions are applied to printable objects with a common attribute (or group of common attributes). As another example, for print rules that are highly insensitive to change, the threshold quantity can be a relatively large number such that a print rule is defined after many print actions are applied to printable objects with a common attribute.

Moreover, as discussed above, the attributes or attribute types that are analyzed at block 140 can vary according to different implementations. That is, the attributes that are used to define a print rule at block 140 can vary among implementations. For example, in one implementation, a print rule can be defined based on a single attribute such as a file type. Thus, after the threshold quantity of print actions are applied to printable objects with a particular file type, a print rule for that file type is defined at block 140. That is, a print rule with that file type as a condition is defined at block 140. As another example, in another implementation, a print rule can be defined based on a variety of attributes such as a file type, an origin, and a size. More specifically, for example, after the threshold quantity of print actions are applied to printable objects with a particular file type, origin, and resolution, a print rule with conditions for that file type, that origin, and that resolution is defined at block 140.

In some implementations, a print action is implicitly related to a print rule. For example, a printable object processing system can associate a particular print action with each print rule. That is, a printable object processing system implementing process 100 can perform a particular print action on new printable objects that satisfy any print rule. In other implementations, a print action is explicitly related to a print rule. For example, a print rule can include a field that identifies a print action, and a printable object processing system implementing process 100 can perform that print action on new printable objects that satisfy that print rule. Such a print action can be selected at block 140 based on statistical analysis of information related to print actions relative to printable objects detected at block 110. For example, the print action that was performed most frequently relative to print actions that share a common attribute can be specified in the print rule defined at block 140 for which that attribute is a condition. In other implementations, a default print action can be specified in a print rule defined at block 140.

In other implementations, a print action for a print rule can be specified by a user. For example, a printable object processing system implementing process 100 can prompt (e.g., via a user interface) a user to select or input a print action at block 140.

The print rule can then be applied to a new printable object as illustrated at block 150. A print rule is applied to a new printable object by determining whether the new printable object satisfies the print rule, and performing a print action related to the print rule on the new printable object. As discussed above, print actions initiated or requested by a user can be referred to as user print actions. In contrast, print actions initiated or requested by a printable object processing system can be referred to as system print actions. Blocks 151-153 illustrate an example of applying a print rule to a new printable object.

A new printable object is detected by a printable object processing system implementing process 100 at block 151. Similar to detecting print actions discussed above in relation to block 110, the printable object processing system can instrument applications and/or a runtime environment to receive notifications when new printable objects are available. For example, the printable object processing system can be a plug-in to an electronic mail client that receives notification when electronic mail messages are received. As another example, the printable object processing system can hook into an operating system or service (e.g., a data repository) to receive notification printable objects are stored at a filesystem.

The new printable object is then compared with a print rule (or group of print rules) to determine whether the new printable object satisfies the print rule at block 152. More specifically, for example, attributes of the new printable object are compared with the condition (or conditions) of the print rule to determine whether attribute of the new printable object satisfy the condition. If an attribute of the new printable object satisfies the condition, the new printable object is said to satisfy the print rule. An attribute satisfies a condition if the attribute matches or sufficiently matches the condition. For example, a condition can be a file type extension that is compared with a file type attribute in a case-insensitive comparison. In some implementations, a condition can be expressed relative to a comparison operator such as greater-than, greater-than-or-equal-to, less-than, less-than-or-equal-to, or not-equal-to. As an example, the condition can be a minimum size value (e.g., a minimum resolution of an image file or minimum file size) that is satisfied by new printable objects that have a size value greater than the minimum size value. As yet another example, a condition can define a pattern (e.g., using a regular expression) that is satisfied by attributes (e.g., file names, file types, file system paths, or origins of printable objects such as email addresses or domains) that match the pattern.

If the new printable object does not satisfy the print rule, no print action is performed on the new printable object. If, however, the new printable object does satisfy the print rule, in the example illustrated in FIG. 1, process 100 proceeds to block 153 at which the print action associated with the print rule is performed relative to (or on) the new printable object. The print action performed relative to the new printable object is a system print action and can be any of a variety of print actions or a group of print actions. As specific example, the print action can include printing the new printable object at a printer connected to a computing device, printing the new printable object at a network-connected printer, providing the new printable object to a print service, or providing the new printable object to a print repository.

Process 100 illustrated in FIG. 1 is an example implementation. In other implementations, various aspects of process 100 can be different from those discussed above in relation to FIG. 1. For example, in some implementations, a process similar to process 100 defines print rules, but does not apply print rules to new printable objects. Thus, for example, block 150 can be excluded. Moreover, in some implementations, one process can apply print actions defined by another process to new printable objects. Accordingly, blocks 110, 120, 130, and 140 can be implemented at a first process (or printable object processing system implementing the first process) to define print rules, and block 150 can be implemented at another process (or printable object processing system implementing the second process) to apply the print rules defined at the first process to new printable objects. Furthermore, although process 100 is illustrated in FIG. 1 as a sequential process, some blocks can be executed or processed in parallel with other blocks. For example, blocks 110, 120, 130, and 140 can execute sequentially with respect to one another (e.g., as illustrated in FIG. 1), and block 150 can execute in parallel or asynchronously with blocks 110, 120, 130, and 140.

Figure 2:
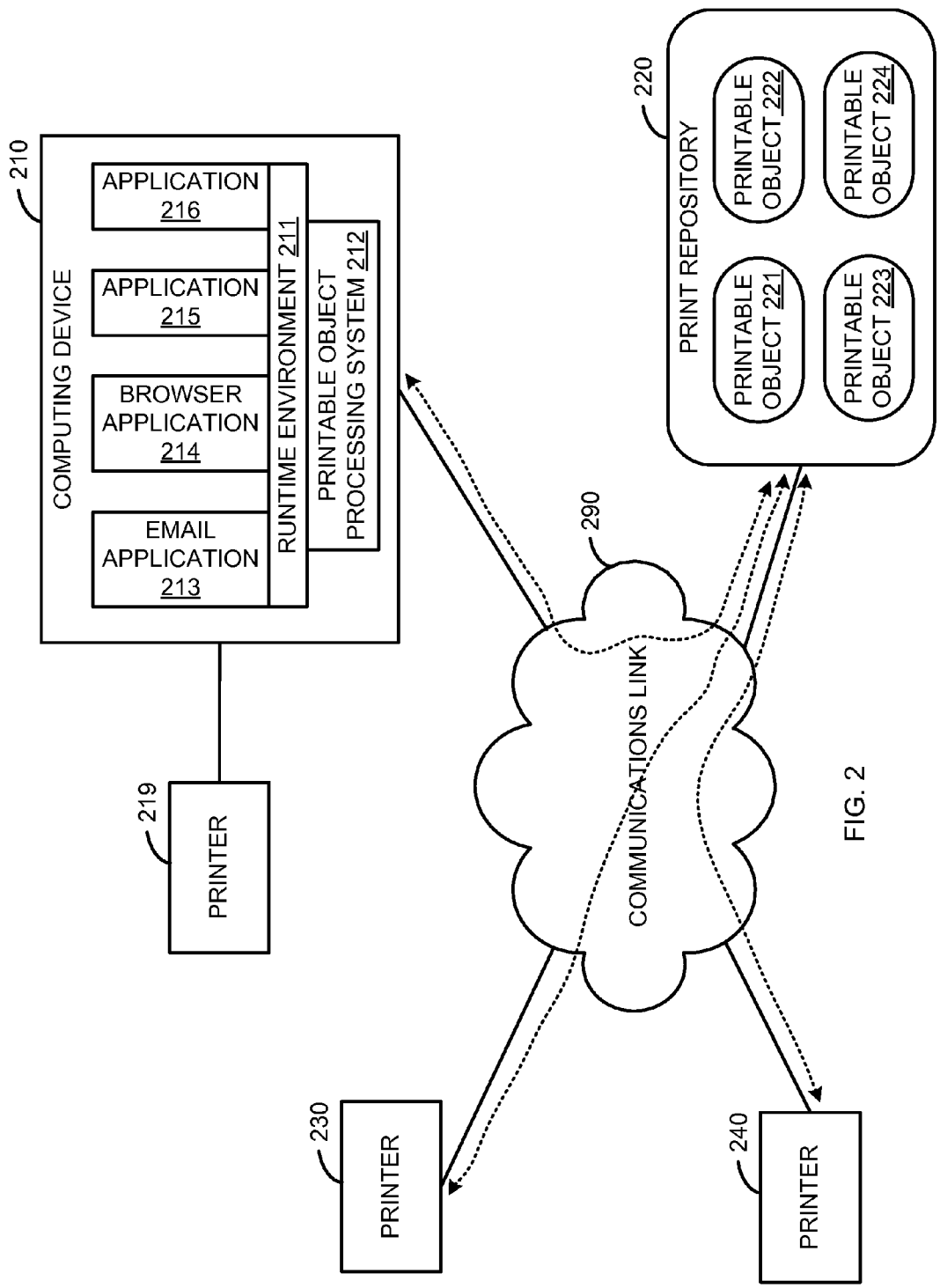
FIG. 2 is an illustration of an environment including a printable object processing system, according to an implementation.

FIG. 2 is an illustration of an environment including a printable object processing system, according to an implementation. The environment illustrated in FIG. 2 includes computing device 210, printer 219, print repository 220, printer 230, printer 240, and communications link 290.

Figure 3:
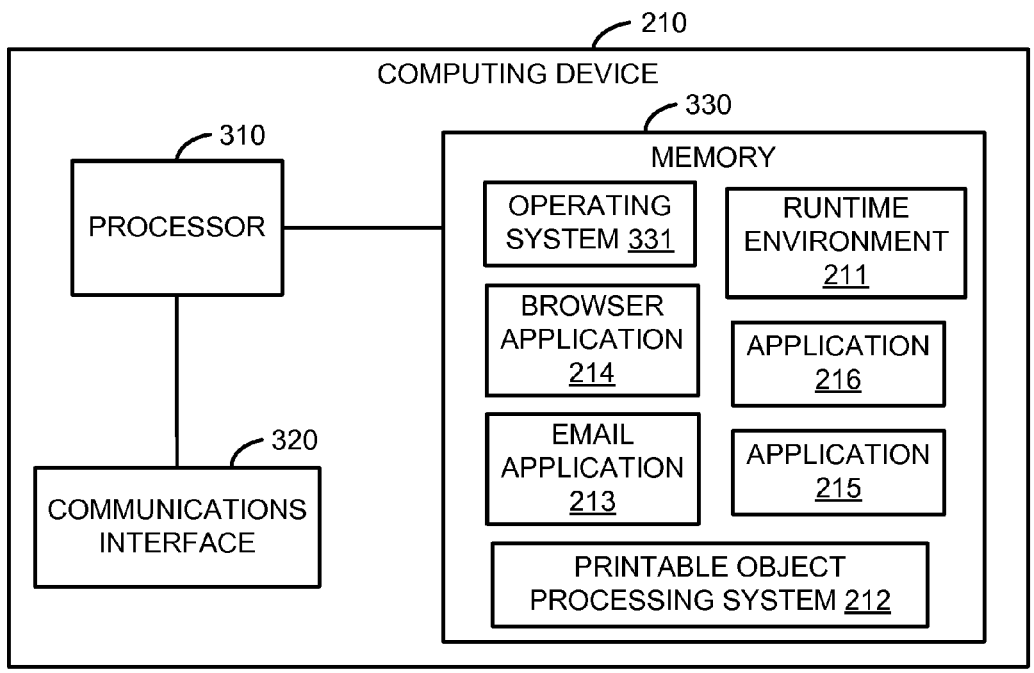
FIG. 3 is a schematic block diagram of a computing device hosting a printable object processing system, according to an implementation.

Computing device 210 hosts runtime environment 211, email application 213, browser application 214, application 215, application 216, and printable object processing system 212. As an example of computing device 210, FIG. 3 is a schematic block diagram of a computing device hosting a printable object processing system, according to an implementation. Computing device 210 (e.g., a computer server, a group of computer servers, a virtual machine, a group of virtual machines, or a combination thereof) includes processor 310, communications interface 320, and memory 330. Processor 310 is any combination of hardware and software that executes or interprets instructions, codes, or signals. For example, processor 310 can be a microprocessor, an application-specific integrated circuit (ASIC), a distributed processor such as a cluster or network of processors or computing devices, a multi-core or multi-processor processor, or a virtual or logical processor of a virtual machine.

Communications interface 320 is a module via which processor 310 can communicate with other processors or computing devices via communications link. For example, communications interface 320 can include a network interface card and a communications protocol stack hosted at processor 310 (e.g., instructions or code stored at memory 330 and executed or interpreted at processor 310 to implement a network protocol). As specific examples, communications interface 320 can be a wired interface, a wireless interface, an Ethernet interface, a Fiber Channel interface, an InfiniBand interface, and IEEE 802.11 interface, or some other communications interface via which processor 310 can exchange signals or symbols representing data to communicate with other processors or computing devices.

Memory 330 is a processor-readable medium that stores instructions, codes, data, or other information. As used herein, a processor-readable medium is any medium that stores instructions, codes, data, or other information non-transitorily and is directly or indirectly accessible to a processor. Said differently, a processor-readable medium is a non-transitory medium at which a processor can access instructions, codes, data, or other information. For example, memory 330 can be a volatile random access memory (RAM), a persistent data store such as a hard disk drive or a solid-state drive, a compact disc (CD), a digital video disc (DVD), a Secure Digital™ (SD) card, a MultiMediaCard (MMC) card, a CompactFlash™ (CF) card, or a combination thereof or other memories. In some implementations, memory 330 can be integrated with processor 310, separate from processor 310, or external to computing device 210.

Memory 330 includes modules (e.g., instructions or codes) that when executed at processor 310 implement operating system 331, runtime environment 211, printable object processing system 212, email application 213, browser application 214, and applications 215 and 216. In other words, operating system 331, runtime environment 211, printable object processing system 212, email application 213, browser application 214, and applications 215 and 216 are each modules that—when executed at processor 310—cause processor 310 to perform operations that implement, respectively, an operating system, a printable object processing system, an email application, a browser application, and other applications. Said differently, operating system 331, runtime environment 211, printable object processing system 212, email application 213, browser application 214, and applications 215 and 216 are hosted at computing device 210 (or at processor 310). In some implementations, other modules such as a print driver or print manager are also hosted at computing device 210.

In some implementations, computing device 210 can be a virtualized computing device. For example, computing device 210 can be hosted as a virtual machine at a computing server. Moreover, in some implementations, computing device 210 can be a virtualized computing appliance, and operating system 331 is a minimal or just-enough operating system to support (e.g., provide services such as a communications protocol stack and access to components of computing device 210 such as communications interface 320) runtime environment 211, printable object processing system 212, email application 213, browser application 214, and applications 215 and 216.

Printable object processing system 212 (and runtime environment 211, email application 213, browser application 214, and applications 215 and 216) can be accessed or installed at computing device 210 from a variety of memories or processor-readable media. For example, computing device 210 can access a remote processor-readable medium via communications interface 320 and printable object processing system 212 at that processor-readable medium. As a specific example, computing device 210 can be a thin client that accesses operating system 331 and printable object processing system 212 during a boot sequence.

As another example, computing device 210 can include (not illustrated in FIG. 3) a processor-readable medium access device (e.g., CD, DVD, SD, MMC, or a CF drive or reader) and printable object processing system 212 at a processor-readable medium via that processor-readable medium access device. As a more specific example, the processor-readable medium access device can be a DVD drive at which a DVD including an installation package for printable object processing system 212 is accessible. The installation package can be executed or interpreted at processor 310 to install printable object processing system 212 at computing device 210 (e.g., at memory 330). Computing device 210 can then host or execute the print service system.

In some implementations, printable object processing system 212 can be accessed at or installed from multiple sources, locations, or resources. For example, some components or modules of printable object processing system 212 can be installed via a communications link, and other components or modules of printable object processing system 212 can be installed from a DVD.

Referring to FIG. 2, runtime environment 211 is a module or group of modules that support execution of email application 213, browser application 214, application 215, and application 216 at computing device 210. For example, runtime environment 211 can be an operating system, a virtual machine (e.g., a Java™ virtual machine (JVM)), a software library or framework, or an application server. Email application 213, browser application 214, application 215, and application 216 are modules or groups of modules that are hosted at computing device 210 that operate on or with printable objects. Either or both of applications 215 and 216 can be, for example, an image manipulation or management application, a word processing application, a shell such as a command line shell or GUI shell of an operating system, a print driver or print manager, or any other application that interacts with printable objects.

As illustrated in FIG. 210, printable object processing system 212 instruments runtime environment 211 to detect print actions relative to printable objects and new printable objects at email application 213, browser application 214, application 215, application 216, and/or other applications (not shown) hosted at computing device 210. For example, printable object processing system 212 can instrument runtime environment 211 by registering to receive notifications of print actions, by hooking runtime environment 211, or by altering code or instructions of runtime environment 211. In other implementations, printable object processing system 212 can instrument email application 213, browser application 214, application 215, application 216, and/or other applications hosted at computing device 210 individually to detect print actions at those applications and new printable objects. In yet other implementations, printable object processing system 212 can instrument applications hosted at computing device 210 and runtime environment 211 to detect print actions at those applications and new printable objects.

Printer 219 is a printer that is local or locally connected to computing device 210. That is, for example, printer 219 communicates with computing device 210 via an interface such as a Universal Serial Bus (USB), parallel port, a wireless interface such as Bluetooth™ or Wi-Fi Direct™, or some other interface independent of communications link 290. In some implementations, an environment including a printable object processing system does not include a local printer.

Print repository 220 is a service hosted at a computing device or group of computing devices at which printable objects can be stored (e.g., at a persistent memory such as a hard disk drive) and accessed by network-connected printers. As illustrated in FIG. 2, print repository 220 is independent of printers 230 and 240. That is, print repository 220 is not hosted at printer 230 or printer 240. Rather, print repository 220 is hosted at a computing device or group of computing devices independent of (or separate from) printers 230 and 240.

In some implementations, print repository 220 includes accounts and security mechanisms that allow a user of print repository 220 to store printable objects within an account of that user at print repository 220 such that other users of print repository 220 cannot access those printable objects. Said differently, printable objects 221, 222, 223, and 224 can each be associated with an account.

As an example, a credential such as a user name and password can be required to store and/or to access printable objects at an account of print repository 220. Thus, the credential for an account is required to store printable objects at print repository 220 and to access printable objects at print repository 220. Said differently, the credential is used to log into print repository 220 to store and/or to access printable objects at print repository 220.

Printers 230 and 240 are network-connected printers. As used herein, the term "network-connected printer" means a printer can be connected to a communications link such as a computer network and is capable of obtaining representations of printable objects, sending and receiving data, accessing representations of printable objects, and/or accessing applications via the communications link. Additionally, printers 230 and 240 can request printable objects (or representations such as rasterized or rendered representations of printable objects) from print repository 220. For example, printer 230 can host an application including a GUI via which a user can log into an account at print repository 220 and request printable objects associated with that account. Print repository 220 provides those printable objects to printer 230, and printer 230 prints those printable objects. Thus, a user can initiate printing of printable objects stored at print repository 220 from printer 230 or from other network-connected printers to which print repository 220 is accessible.

Additional information related to print repositories is disclosed in U.S. patent application Ser. No. 13/307,166, filed on Nov. 30, 2011, and entitled "STORAGE OF PROCESSED CONTENT FOR PRINTING," which is incorporated herein by reference in its entirety. U.S. patent application Ser. No. 13/307,166 discloses, for example, print repositories implemented as computer and/or server systems with storage for a rapid printing service that receive printable objects (or content), store the printable objects (or representations thereof), and provide the printable objects to printers.

Communications link 290 includes devices, services, or a combination thereof that define communications paths between computing device 210, print repository 220, printer 230, printer 240, and/or other devices or services. For example, communications link 290 can include one or more of a cable (e.g., twisted-pair cable, coaxial cable, or fiber optic cable), a wireless link (e.g., radio-frequency link, optical link, or sonic link), or any other connectors or systems that transmit or support transmission of signals. Communications link 290 can include communications networks such as an intranet, the Internet, other telecommunications networks, or a combination thereof. Additionally, communications link 290 can include proxies, routers, switches, gateways, bridges, load balancers, and similar communications devices. Furthermore, the connections and communications paths illustrated in FIG. 2 are logical and do not necessarily reflect physical connections.

As an example of data flow in the environment illustrated in FIG. 2, a user of computing device 210 can perform (or initiate or request) a print action relative to printable content via email application 213, browser application 214, application 215, application 216, and/or other applications. For example, a user of computing device 210 can print printable objects from email application 213, browser application 214, application 215, application 216, and/or other applications at printer 219. Alternatively, for example, a user of computing device 210 can print printable objects from email application 213, browser application 214, application 215, application 216, and/or other applications at a network-connected printer such as, for example, printer 230 or printer 240. Moreover, user of computing device 210 can, for example, provide printable objects from email application 213, browser application 214, application 215, application 216, and/or other applications to print repository 220 or a print service (not shown) such as an ePrint™ service from Hewlett-Packard Company. Printable object processing system 212 detects the print action (e.g., via runtime environment 211 or via an application) and, in response, determines whether a print rule should be defined.

Additionally, printable object processing system 212 detects new printable objects (e.g., via runtime environment 211 or via an application) and, in response, applies a print rule (or a group of print rules) to the new printable objects. For example, printable object processing system 212 can receive a notification in response to a variety of events at computing device 210. As specific examples, printable object processing system 212 can receive a notification in response to: receipt of an electronic mail message including a printable object at email application 213, download of or access to a printable object at browser application 214, or transfer of a printable object to a filesystem (not shown) hosted at computing device 210.

If a new printable object satisfies a print rule, a print actions associated with that print rule is performed on the printable object. As illustrated in FIG. 2, printable object processing system 212 is in communication with print repository 220, and printable object processing system 212 provides printable objects that satisfy print rules to print repository 220. Said differently, printable objects 221, 222, 223, and 224 were new printable objects detected by printable object processing system 212 which satisfied a print rule or a group of print rules. As discussed above, in some implementations, printable objects are stored in secured accounts at print repository 220. Accordingly, printable object processing system 212 can provide a credential to print repository 220 to log into an account of print repository 220 before providing a printable object to print repository 220. Additionally, in some implementations, printable object processing systems in addition to printable object processing system 212 can provide printable objects to print repository 220.

As discussed above, a user of printer 230 and/or printer 240 can access printable objects at print repository 220, and print those printable objects. In some implementations, printers 230 and 240 each include an interface via which a user can log into an account of print repository 220, view printable objects or a representation thereof, and request printing of a printable object at those printers.

Figure 4:
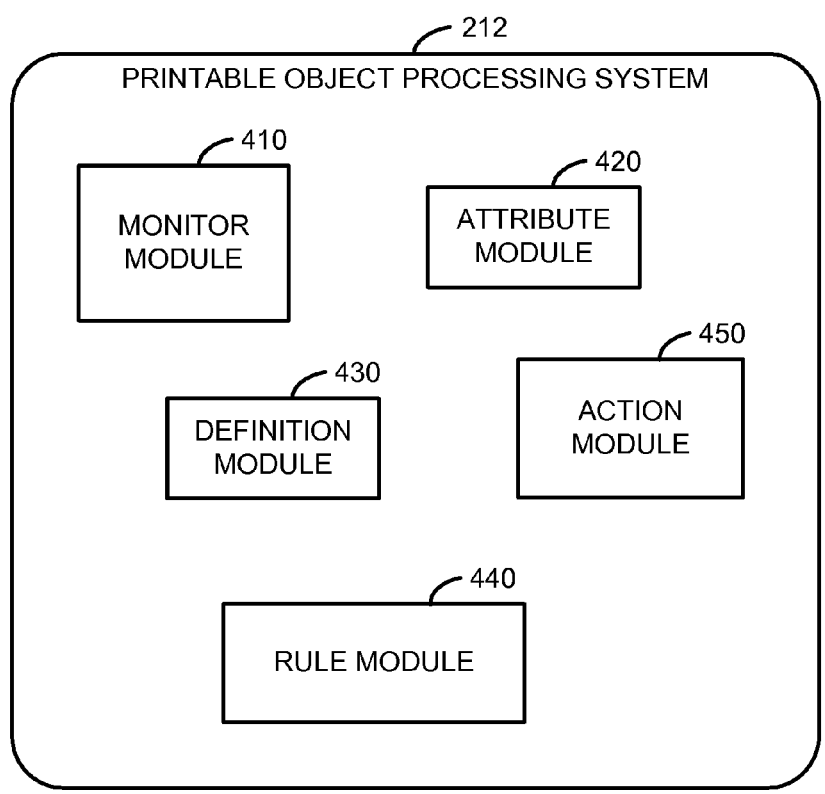
FIG. 4 is an illustration of a printable object processing system, according to an implementation.

FIG. 4 is an illustration of a printable object processing system, according to an implementation. Although various modules (i.e., combinations of hardware and software) are illustrated and discussed in relation to FIG. 4 and other example implementations, other combinations or sub-combinations of modules can be included within other implementations. Said differently, although the modules illustrated in FIG. 4 and discussed in other example implementations perform specific functionalities in the examples discussed herein, these and other functionalities can be accomplished, implemented, or realized at different modules or at combinations of modules. For example, two or more modules illustrated and/or discussed as separate can be combined into a module that performs the functionalities discussed in relation to the two modules. As another example, functionalities performed at one module as discussed in relation to these examples can be performed at a different module or different modules.

Printable object processing system 212 includes monitor module 410, attribute module 420, definition module 430, rule module 440, and action module 450. Monitor module 410 detects print actions relative to printable objects. For example, a notification can be provided from a runtime environment or application to monitor module 410 in response to a print action relative to a printable object. In some implementations, monitor module 410 also instruments a runtime environment or application to detect print actions.

Monitor module 410 is in communication with attribute module 420, and provides a signal or instruction to attribute module 420 in response to detection of a print action relative to a printable object. Attribute module 420 then identifies one or more attributes of the printable object. In other words, attribute module 420 determines one or more attributes of the printable object. For example, attribute module 420 can request metadata related to the printable object from a runtime environment such as an operating system or can parse the printable object to determine attributes of attributes of the printable object.

In some implementations, attribute module 420 accesses configuration information that identifies attributes or attribute types that should be considered by attribute module 420. For example, a configuration file of printable object processing system 212 can specify which attribute types of printable objects are of interest to printable object processing system 212 and, attribute module 420 can determine attributes of those attribute types.

Definition module 430 defines print rules based on attributes of printable objects. In other words, definition module 430 determines when a print rule should be generated, the condition or conditions for that print rule, and what print action (or print actions) should be associated with that print rule. For example, definition module 430 can determine that a threshold quantity or frequency of print actions have been performed on printable objects with a common attribute, and, in response, define a print rule with that attribute as a condition. In some implementations, the threshold quantity or frequency and attribute of interest can be specified in configuration information such as a configuration file for printable object processing system 212. That is, if the threshold quantity or frequency of print actions have been performed on printable objects with a common attribute (e.g., of an attribute type specified in the configuration information), definition module 430 defines a print rule with a condition satisfied by that attribute (or a print rule for that attribute). In some implementations, attributes of interest can be defined dynamically by definition module 430 based on quantities of or frequencies at which print actions are performed on printable objects which have a common attribute.

In some implementations, definition module 430 defines print rules for multiple attributes. That is, definition module 430 defines print rules with conditions for each of a group of attributes that are satisfied by printable objects with those attributes. For example, definition module 430 can define a print rule for a group of attributes after a threshold quantity (or frequency) of print action have been performed on printable objects with a group of common attributes. The group of common attributes can be specified, for example, in configuration information for printable object processing system 212. As an alternative example, a group of attributes can be determined dynamically by definition module 430 based on statistical analysis of print actions performed on printable objects. For example, definition module 430 can dynamically define groups of attributes based on quantities of or frequencies at which print actions are performed on printable objects which have common attributes.

In addition to defining print rules, definition module 430 updates print rules in some implementations. For example, a print rule can be defined with a condition that is satisfied for a first attribute at a first time. At a later time, definition module 430 can determine that a threshold quantity or frequency of print actions for updating a print rule has been performed on printable objects with the first attribute and a second attribute. Definition module 430 can then identify the print rule, for example, based on the condition satisfied by the first attribute, and can update or modify the print rule to have an additional condition that is satisfied by the second attribute. In some implementations, the threshold quantity or frequency of print actions for updating a print rule can be the same as for defining a print rule. Accordingly, in some implementations, definition module 430 can determine whether a print rule exists and/or should be updated before defining a new print rule. For example, definition module 430 can determine that an existing print rule should be updated if all conditions of the existing print rule are satisfied by attributes that would otherwise be used for conditions of a new print rule. If the existing print rule includes conditions that are not satisfied by those attributes, a new print rule can be defined.

As discussed above, updating a print rule can include adding a condition or conditions to the print rule, and can also include modifying a print action (e.g., adding, removing, or replacing) a print action associated with the print rule. Moreover, updating a print rule can include removing a condition or conditions from a print rule. For example, if all conditions of an existing print rule except one condition are satisfied by attributes that would otherwise be used for conditions of a new print rule, that condition can be removed from the existing print rule.

In some implementations, in addition to determining conditions for print rules, definition module 430 also determines a print action for print rules. A print action can be specified statically, for example, in configuration information for printable object processing system 212. For example, configuration information for printable object processing system 212 can specify that the print action for print rules should include providing printable objects that satisfy those print rules to a print repository. In other implementations, a print action can be specified dynamically, for example, based on the print actions that were performed on printable objects in response to which the print rules were defined. As an example, if the majority of print actions performed on printable objects in response to which the print rules were defined included printing at a local printer, the print action for those print rules can include printing at a local printer. Thus, the print action for a print rule can be the print action in response to which the print rule was defined or a different print action.

Rule module 440 determines whether printable objects (e.g., new printable objects) satisfy a print rule. For example, rule module 440 compares attributes of printable objects with conditions of print rules to determine whether those printable objects satisfy a print rule. In some implementations, print rules are stored at rule module 440 (e.g., at a portion of a memory or data store allocated to rule module 440). In other implementations, print rules are stored at a memory or data store accessible to rule module 440.

If a printable object satisfies a print rule, rule module 440 provides a signal or instruction to action module 450 to perform a print action on that printable object. As discussed above, the print action can be explicitly associated with the print rule (e.g., specified in the print rule) or implicitly associated with the print rule. Accordingly, in some implementations, action module 450 performs a print action based on an identifier of a print action at the print rule. In other implementations, action module 450 performs a particular print action regardless of the presence of an identifier of a print action at a print rule. In, some implementations, multiple print actions are associated with a print rule, and action module 450 performs each such print action on that printable object in response to a signal or instruction from rule module 440.

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. As another example, functionalities discussed above in relation to specific modules or elements can be included at different modules, engines, or elements in other implementations. Furthermore, it should be understood that the systems, apparatus, and methods described herein can include various combinations and/or sub-combinations of the components and/or features of the different implementations described. Thus, features described with reference to one or more implementations can be combined with other implementations described herein.

As used herein, the term "module" refers to a combination of hardware (e.g., a processor such as an integrated circuit or other circuitry) and software (e.g., machine- or processor-executable instructions, commands, or code such as firmware, programming, or object code). A combination of hardware and software includes hardware only (i.e., a hardware element with no software elements), software hosted at hardware (e.g., software that is stored at a memory and executed or interpreted at a processor), or at hardware and software hosted at hardware. Additionally, as used herein, the singular forms "a," "an," and "the" include plural referents unless the context clearly dictates otherwise. Thus, for example, the term "module" is intended to mean one or more modules or a combination of modules.

Moreover, the term "provide" as used herein includes push mechanism (e.g., sending data independent of a request for that data), pull mechanisms (e.g., delivering data in response to a request for that data), and store mechanisms (e.g., storing data at an intermediary at which the data can be accessed). Furthermore, as used herein, the term "based on" means "based at least in part on." Thus, a feature that is described as based on some cause, can be based only on the cause, or based on that cause and on one or more other causes.

What is claimed is:

1. A printable object processing system, comprising:
   a monitor module to detect a user print action relative to a first printable object;
   an attribute module to identify an attribute of the first printable object;
   a definition module to define a print rule without user input based on the attribute of the first printable object;
   a rule module to determine whether a second printable object satisfies the print rule; and
   an action module to perform a print action without user input on the second printable object in response to satisfaction of the print rule.

2. The system of claim 1, wherein the print rule is associated with the print action, the print action is different from the user print action.

3. The system of claim 1, wherein the printable object is included within an electronic mail message.

4. The system of claim 1, wherein:
   the action module performs the print action on the second printable object, the print action is different from the user print action.

5. The system of claim 1, wherein:
   the action module performs the print action on the second printable object, the print action includes providing the second printable object to a print repository independent of a printer.

6. The system of claim 1, wherein:
   the action module performs the print action on the second printable object, the print action includes providing the second printable object to a print repository.

7. The system of claim 1, wherein:
   the user print action is a first user print action;
   the attribute is a first attribute;
   the monitor module is configured to detect a second user print action relative to a third printable object, the third printable object having the first attribute and a second attribute; and
   the definition module is configured to update the print rule based on the second attribute.

8. A processor-readable medium storing code representing instructions that when executed at a processor cause the processor to:
   detect a plurality of print actions, each print action from the plurality of print actions relative to a printable object from a plurality of printable objects, each printable object from the plurality of printable objects having a common attribute;
   define a print rule without user input based on the common attribute of the plurality of printable objects;

determine whether a new printable object satisfies the print rule; and apply a print action without user input to the new printable object in response to the new printable object satisfying the print rule.

9. The processor-readable medium of claim 8, wherein each print action from the plurality of print actions is a user print action.

10. The processor-readable medium of claim 8, wherein:

each print action from the plurality of print actions is a user print action; and the print action applied to the new printable object is a system print action.

11. The processor-readable medium of claim 8, wherein:

each print action from the plurality of print actions is a user print action; and the print action applied to the new printable object is to provide the new printable object to a print repository independent of a printer.

12. The processor-readable medium of claim 8, wherein:

each print action from the plurality of print actions is a user print action to print the printable object to which that print action is relative or to provide the printable object to which that print action is relative to a print repository independent of a printer.

13. The processor-readable medium of claim 8, wherein the print rule is defined in response to a print action from the plurality of print actions.

14. The processor-readable medium of claim 8, wherein the common attribute is a first common attribute, the processor-readable medium further storing code representing instructions that when executed at a processor cause the processor to:

identify the first common attribute and a second common attribute at each printable object from the plurality of printable objects, the print rule is based on the first common attribute and the second common attribute.

15. A processor-readable medium storing code representing instructions that when executed at a processor cause the processor to:

detect a plurality of user print actions, each user print action from the plurality of user print actions relative to a printable object from a plurality of printable objects, each printable object from the plurality of printable objects having a common attribute;

define a print rule without user input based on the common attribute of the plurality of printable objects;

determine whether a new printable object satisfies the print rule; and apply a system print action without user input to the new printable object in response to the new printable object satisfying the print rule.

16. The processor-readable medium of claim 15, further storing code representing instructions that when executed at a processor cause the processor to:

detect the user print action relative to the printable object;

identify an attribute of the printable object in response to detecting the user print action; and define the print rule based on the attribute.

17. The processor-readable medium of claim 15, wherein the new printable object is included within an electronic mail message.

18. The processor-readable medium of claim 15, wherein the user print action is to print the printable object to which the user print action is relative.

19. The processor-readable medium of claim 15, wherein the user print action is to provide the printable object to which the user print action is relative to a print repository independent of a printer.

* * * * *